US010870482B2

(12) United States Patent
Neff et al.

(10) Patent No.: US 10,870,482 B2
(45) Date of Patent: Dec. 22, 2020

(54) AIRCRAFT CONTROL SELECTOR LEVERS

(71) Applicant: Hamilton Sundstrand Corporation, Charlotte, NC (US)

(72) Inventors: Samuel Neff, Peoria, IL (US);
Christopher Dias, Rockford, IL (US);
Andrew Hanley, Riverside, IL (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 320 days.

(21) Appl. No.: 15/952,778

(22) Filed: Apr. 13, 2018

(65) Prior Publication Data
US 2019/0315453 A1 Oct. 17, 2019

(51) Int. Cl.
*B64C 13/14* (2006.01)
*B64C 13/04* (2006.01)

(52) U.S. Cl.
CPC ............ *B64C 13/14* (2013.01); *B64C 13/042* (2018.01)

(58) Field of Classification Search
CPC ......... B64C 13/14; B64C 13/04; B64C 13/10; B64C 13/042; B64C 13/0421; B64C 13/0423; B64C 13/0425; B64C 13/0427
See application file for complete search history.

(56) References Cited
U.S. PATENT DOCUMENTS

| | | | |
|---|---|---|---|
| 5,984,241 A | 11/1999 | Sparks | |
| 8,950,740 B2 | 2/2015 | Kopp | |
| 9,469,393 B2 | 10/2016 | Antraygue | |
| 2008/0092609 A1* | 4/2008 | Markbreit | B64C 13/0423 70/254 |
| 2014/0157943 A1* | 6/2014 | John | G05G 5/06 74/526 |
| 2015/0266564 A1* | 9/2015 | Iliescu | B64C 13/10 74/523 |
| 2016/0085258 A1* | 3/2016 | Crandall-Seibert | G05G 25/00 74/526 |
| 2016/0185448 A1 | 6/2016 | Scacchi et al. | |
| 2017/0113783 A1* | 4/2017 | Scofield | B64C 27/57 |
| 2018/0017987 A1* | 1/2018 | Crandall-Seibert | B64C 13/26 |

FOREIGN PATENT DOCUMENTS

| | | |
|---|---|---|
| EP | 2119626 A1 | 11/2009 |
| GB | 603456 A | 6/1948 |

OTHER PUBLICATIONS

European Search Report for European Application No. 19168627.8, International Filing Date Apr. 11, 2019, dated Oct. 9, 2019, 5 pages.

* cited by examiner

*Primary Examiner* — Philip J Bonzell
*Assistant Examiner* — Tye William Abell
(74) *Attorney, Agent, or Firm* — Cantor Colburn LLP

(57) ABSTRACT

Selector lever systems of aircraft are provided. The selector lever systems include a selector lever configured to control operation of one or more aircraft control surfaces, the selector lever having a handle configured to enable manual operation of the selector lever, a touch sensor arranged on the handle, and a controller arranged in communication with the touch sensor, the controller configured to at least one of generate a notification when a signal is received from the touch sensor and unlock the selector lever from a locked state.

20 Claims, 6 Drawing Sheets

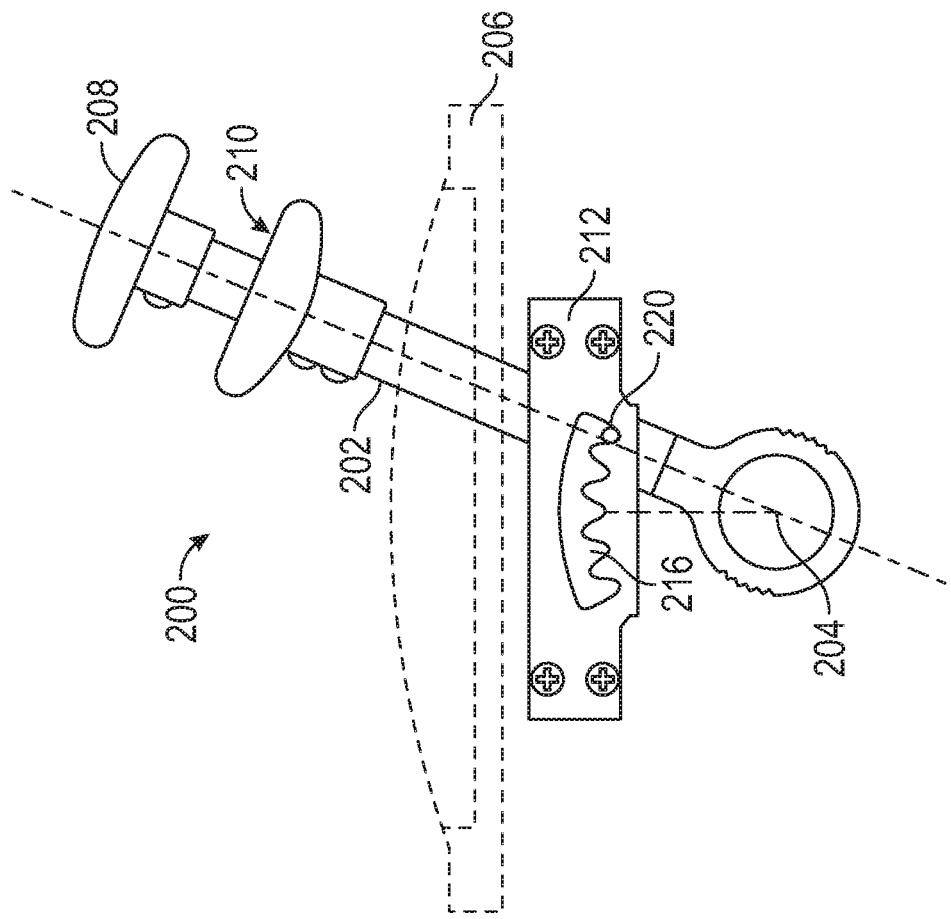
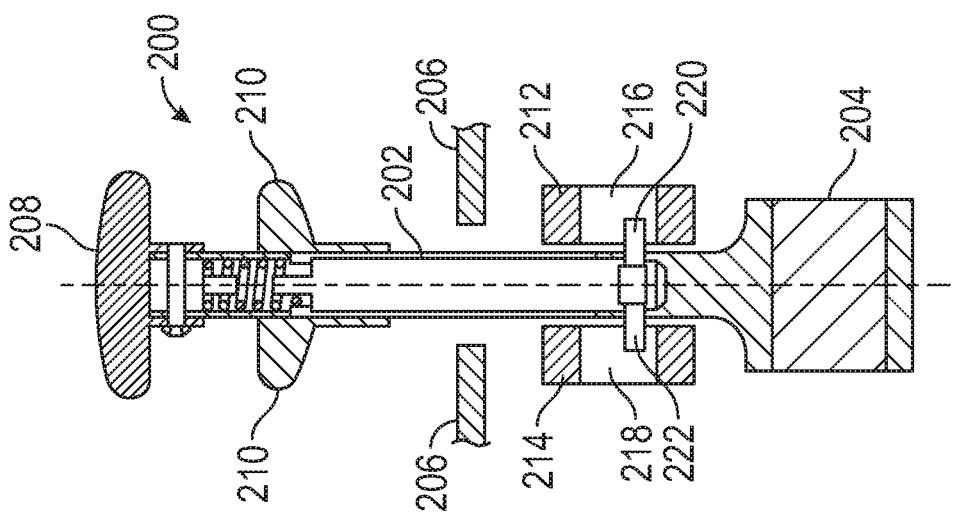
FIG. 2B
FIG. 2A

AIRCRAFT CONTROL SELECTOR LEVERS

BACKGROUND

The present disclosure relates generally to selector levers and, more particularly, to selector levers that may be found, for example, in the cockpit of an aircraft.

Modern aircraft often use a variety of high lift leading and trailing edge devices to improve high angle of attack performance during various phases of flight, for example, takeoff and landing. Such device include flaps, ailerons, and other moveable features of the aircraft. Conventional aircraft are commonly equipped with a selector lever for manually controlling the actuation of the flight control devices (e.g., flaps, ailerons, or other moveable features of the aircraft). The selector lever is mounted in the cockpit for the pilot to select the desired equipment configuration by moving the lever to a position corresponding to that configuration. The conventional selector lever is typically constructed with a shaft rotatably arranged adjacent one or two detent plates. One or two detent pins corresponding to the detent plates are movably arranged on the shaft.

The position of the selector lever is critical for safe operation of an aircraft. However, at times, unintentional movement of the lever to a non-desired position may occur. Additionally, at times, visibility of the selector lever (or the position thereof or indicators associated therewith) may be obstructed. Accordingly, improved selector levers for aircraft may be desirable.

BRIEF DESCRIPTION

According to some embodiments, selector lever systems of aircraft are provided. The selector lever systems include a selector lever configured to control operation of one or more aircraft control surfaces, the selector lever having a handle configured to enable manual operation of the selector lever, a touch sensor arranged on the handle, and a controller arranged in communication with the touch sensor, the controller configured to at least one of generate a notification when a signal is received from the touch sensor and unlock the selector lever from a locked state.

In addition to one or more of the features described above, or as an alternative, further embodiments of the selector lever systems may include that the touch sensor is located on at least one of a top surface and a side surface of the handle.

In addition to one or more of the features described above, or as an alternative, further embodiments of the selector lever systems may include that the notification is at least one of an auditory announcement and a visual display indicating a position of at least one of the selector lever and the one or more aircraft control surfaces.

In addition to one or more of the features described above, or as an alternative, further embodiments of the selector lever systems may include that the controller is part of a flight computer of the aircraft.

In addition to one or more of the features described above, or as an alternative, further embodiments of the selector lever systems may include that the touch sensor is one of a capacitive touch-sensor, an inductive touch-sensor, and a pressure touch-sensor.

In addition to one or more of the features described above, or as an alternative, further embodiments of the selector lever systems may include that the selector lever comprises a housing and a shaft, wherein the handle is disposed on an end of the shaft.

In addition to one or more of the features described above, or as an alternative, further embodiments of the selector lever systems may include a locking mechanism configured to lock the selector lever in a locked state until a predetermined touch is detected at the touch sensor.

In addition to one or more of the features described above, or as an alternative, further embodiments of the selector lever systems may include that the locking mechanism is at least one of electromechanical and electromagnetic.

In addition to one or more of the features described above, or as an alternative, further embodiments of the selector lever systems may include that the locking mechanism is arranged to engage with at least one of a collar and a shaft of the selector lever.

In addition to one or more of the features described above, or as an alternative, further embodiments of the selector lever systems may include that the predetermined touch is at least one of a contact of a predetermined duration and a predetermined pressure.

In addition to one or more of the features described above, or as an alternative, further embodiments of the selector lever systems may include a software locking mechanism configured to prevent movement of the one or more control surfaces in response to movement of the selector lever until a predetermined touch is detected at the touch sensor.

In addition to one or more of the features described above, or as an alternative, further embodiments of the selector lever systems may include that the predetermined touch is at least one of a contact of a predetermined duration and a predetermined pressure.

According to some embodiments, methods of controlling selector levers of aircraft are provided. The methods include detecting a predetermined contact with a touch sensor on a handle of the selector lever, the selector lever configured to control operation of one or more aircraft control surfaces and at least one of generating a notification in response to the detected predetermined contact and unlocking the selector lever from a locked state in response to the detected predetermined contact.

In addition to one or more of the features described above, or as an alternative, further embodiments of the methods may include that the notification is at least one of an auditory announcement and a visual display indicating a position of at least one of the selector lever and the one or more aircraft control surfaces.

In addition to one or more of the features described above, or as an alternative, further embodiments of the methods may include that the detection is performed by a controller operably connected to the touch sensor.

In addition to one or more of the features described above, or as an alternative, further embodiments of the methods may include that the touch sensor is one of a capacitive touch-sensor, an inductive touch-sensor, and a pressure touch-sensor.

In addition to one or more of the features described above, or as an alternative, further embodiments of the methods may include that a shaft of the selector lever is moveable along a detent system, and wherein the notification comprises an indication of a detent position of the shaft.

In addition to one or more of the features described above, or as an alternative, further embodiments of the methods may include that the selector lever comprises a locking mechanism configured to lock the selector lever in a locked state until the predetermined contact is detected at the touch sensor.

In addition to one or more of the features described above, or as an alternative, further embodiments of the methods may include that the locking mechanism is arranged to engage with at least one of a collar and a shaft of the selector lever.

In addition to one or more of the features described above, or as an alternative, further embodiments of the methods may include a software locking mechanism configured to prevent movement of the one or more control surfaces in response to movement of the selector lever until the predetermined contact is detected at the touch sensor.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

FIG. 2A is a sectioned front view of a selector lever that may incorporate embodiments of the present disclosure;

FIG. 2B is a side elevation view of the selector lever of FIG. 2A;

DETAILED DESCRIPTION

Figure 1:
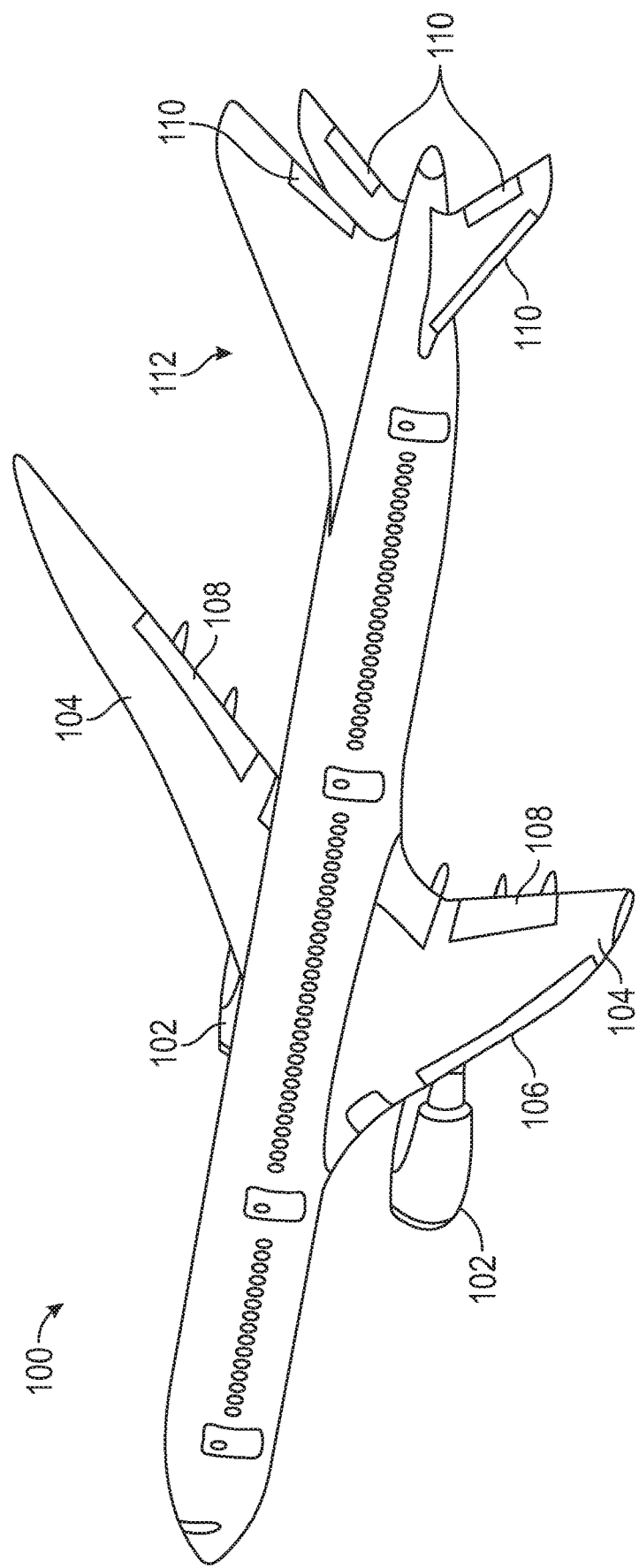
FIG. 1 is a perspective schematic illustration of an aircraft that may incorporate embodiments of the present disclosure.

FIG. 1 illustrates an example of an aircraft 100, illustrated as a commercial aircraft, having aircraft engines 102. The aircraft 100 can embody aspects of the teachings of this disclosure. The aircraft 100, as shown, includes two wings 104 with wing lift systems that each include one or more aerodynamic control surfaces. As shown, the aerodynamic control surfaces include wing control surfaces 106, 108 (e.g., slats and/or flaps) located on the wings 104. The slats 106 are located on a leading edge of the wings 104 and the flaps 108 are located on a trailing edge of the wings 104. Further, as shown, the aerodynamic control surfaces include one or more of an elevator, rudder, horizontal stabilizer, and vertical stabilizer (tail control surfaces 110) located on a tail 112 of the aircraft 100. The term "control surface" as used herein can refer to ailerons, slats, flaps, elevators, rudders, horizontal stabilizers, vertical stabilizers, and/or other controllable surfaces that are operated to enable flight control of the aircraft 100. In some embodiments, primary control surfaces may be, for example, ailerons, elevators, rudders, and secondary control surfaces may be, for example, slat and flap surfaces. Although the description herein will be discussed with respect to the control surfaces 106, 108 located on the wings 104, those of skill in the art will appreciate that embodiments of the present disclosure can be applied to operation of the control surfaces 110 located on the tail 112 of the aircraft 100. The control surfaces 106, 108, 110 can be driven by one or more actuators that are operably connected to the respective control surfaces 106, 108, 110.

Turning now to FIGS. 2A-2B, schematic illustrations of a selector lever 200 that can incorporate embodiments of the present disclosure are shown. FIG. 2A is a sectioned front view of the selector lever 200 and FIG. 2B is a side elevation view thereof. The selector lever 200 includes a shaft 202 that is rotatably attached to a pivot 204 that is disposed in a housing 206. The selector lever 200 further includes a handle 208 on an end of the shaft 202 that extends from the housing 206 and is arranged to allow manual operation of the selector lever 200. A collar 210 is arranged to move along the shaft 202, with the collar 210 being arranged to allow manual operation in concert with the handle 208. For example, the collar 210 may allow for manual locking/unlocking or manual engagement/disengagement of the selector lever 200, as will be appreciated by those of skill in the art.

As illustrated, a first detent plate 212 and a second detent plate 214 are located within the housing 206 and are arranged to allow for locking/unlocking or engagement/disengagement of the selector lever 200 in various positions. The position of the selector lever 200 (e.g., within or along detent plates 212, 214) is associated with a position, angle, or orientation of a control surface of an aircraft. As shown in FIG. 2B, the first detent plate 212 includes a plurality of first slots 216, and the second detent plate 214 includes a corresponding or aligned plurality of second slots 218 (shown in FIG. 2A). A first detent pin 220 is arranged on the shaft 202 to engage the first slots 216 of the first detent plate 212, and a second detent pin 222 is arranged on the shaft 202 (opposite the first detent pin 220) to engage the second slots 218 of the second detent plate 214. The detent pins 220, 222 are operatively connected to the collar 210 such that translational movement of the collar 210 along the shaft 202 results in movement of the detent pins 220, 222. Accordingly, a user can manually lift or move the collar 210 along the shaft 202 to perform engagement/disengagement of the detent pins 220, 222 with the slots 216, 218 of the detent plates 212, 214.

FIG. 2B illustrates the selector lever 200 in an engaged position such that the detent pins 220, 222 are engaged within a respective slot 216, 218. A disengaged position of the selector lever 200 refers to when the respective detent pins 220, 222 are withdrawn from the respective slots. When the selector lever 200 is in the disengaged position, the shaft 202 may be rotated about the pivot 204 to a desired position. The selector lever 200 can then be moved to an engaged position such that the detent pins 220, 222 will engage with slots 216, 218 to lock the shaft 202 in place and thus prevent movement or rotation of the selector lever 200.

As noted above, the position of the selector lever is important or critical to operation and safety associated with flight of aircraft. The selector lever, as described, controls the position of one or more control surfaces of the aircraft, and thus controls flight (e.g., take off, landings, turning, etc.) of the aircraft. It is important for users or operators (e.g., pilots) to know the position of the selector lever and to also prevent unintended movement of the selector lever.

Accordingly, embodiments provided herein are directed to selector levers that provide improved information and/or safety for operation of aircraft. Embodiments provided herein are directed to a selector lever of an aircraft that incorporates a touch sensor (e.g., inductive, capacitive, pressure, etc.) to allow for an electronic mechanism associated with intended use of the selector lever. For example, the touch sensor enables a computational determination (or reactive electrical action) when a user places a hand on the selector lever. In accordance with embodiments of the present disclosure, data obtained at the touch sensor of the selector lever can be used by different systems of the aircraft depending on a desired functionality. For example, a non-exhaustive list of functional options includes, but is not limited to, performing a callout indicating lever position without the pilot having to look at the position of the lever, unlocking the selector lever (or a portion thereof) electromechanically upon touch of the lever, generating visual or audio notifications associated with the selector lever preventing undesired movement, etc. In some embodiments, the sensor data obtained at the touch sensor may be processed within the selector lever unit directly (e.g., when performing an unlock operation). In some embodiments, the sensor data may be transmitted to an external system (e.g., flight computer) to enable the generation of an audio and/or visual data output/notification (e.g., audio announcement of "Flaps ten degrees" to indicate current position associated with the selector lever position).

Figure 3:
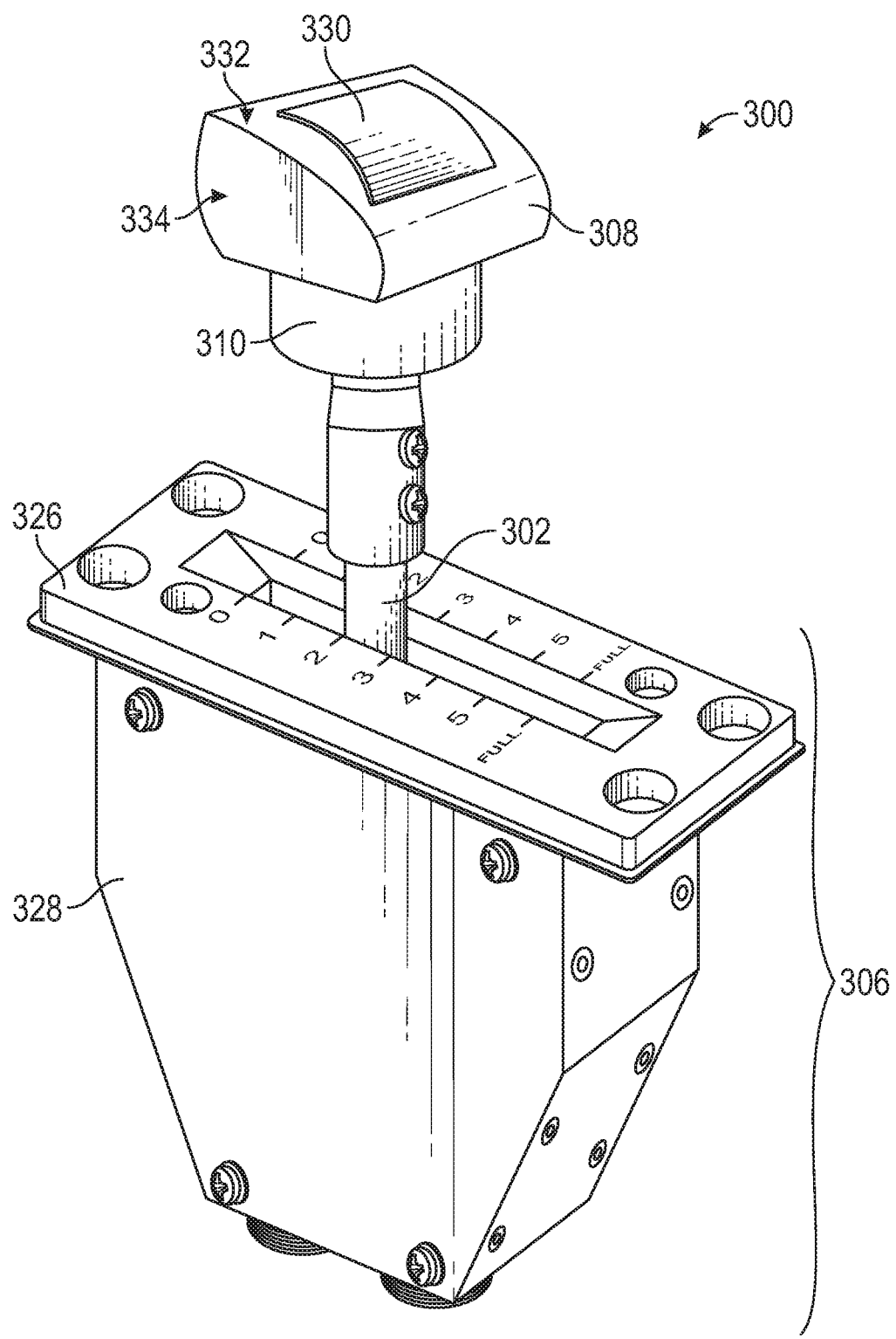
FIG. 3 is a schematic illustration of a selector lever in accordance with an embodiment of the present disclosure.

Turning now to FIG. 3, a schematic illustration of a selector lever 300 in accordance with an embodiment of the present disclosure is shown. The selector lever 300 is similar to that shown and described above, and thus similar features may be omitted from the illustration and/or discussion. The selector lever 300 includes a handle 308 on the end of a shaft 302 to enable operation of one or more flaps, slats, or other control surface(s) of an aircraft. A collar 310 is arranged to move along the shaft 302, with the collar 310 being arranged to allow manual operation in concert with the handle 308.

The shaft 302 extends into a housing 306 wherein various components, such as a detent system, are contained. Further, various electronics and/or electrical components may be housed within the housing 306. Additionally, the housing 306 may include one or more electrical connections and/or ports to enable connection and/or integration into an aircraft control system (e.g., within a cockpit to allow for control of control surfaces of the aircraft).

The housing 306 includes an indicator panel 326. The indicator panel 326 is arranged and/or labeled to provide visual information to a user regarding the location and/or position of the selector lever 300 and/or information regarding the position of one or more control surfaces of an aircraft. The indicator panel 326 is mounted to a base 328 which may define a hollow cavity that includes the detent system, electronics, and various other components of the selector lever 300, as will be appreciated by those of skill in the art. The base 328, in some embodiments, is configured to enable installation within a cockpit of an aircraft.

As shown, the handle 308 includes a touch sensor 330. The touch sensor 330, as shown, is positioned on a top surface 332 of the handle 308 such that the touch sensor 330 will detect or respond to the presence of a hand of a user on the handle 308. In some embodiments, the touch sensor may be positioned on a side surface 334 or other surface of the handle 308 without departing from the scope of the present disclosure. The touch sensor 330 may be an inductive, capacitive, pressure, or other type of touch-based sensor that is responsive to the presence of a user's hand. When a user's hand is detected on the handle 308, at the touch sensor 330, one or more actions may be performed. For example, actions may include, but are not limited to displaying visual information of the current lever position, displaying visual information of the current control surface position, generating audio information of the current lever position and/or control surface position, unlocking the collar 310, unlocking the shaft 302, etc.

Figure 4:
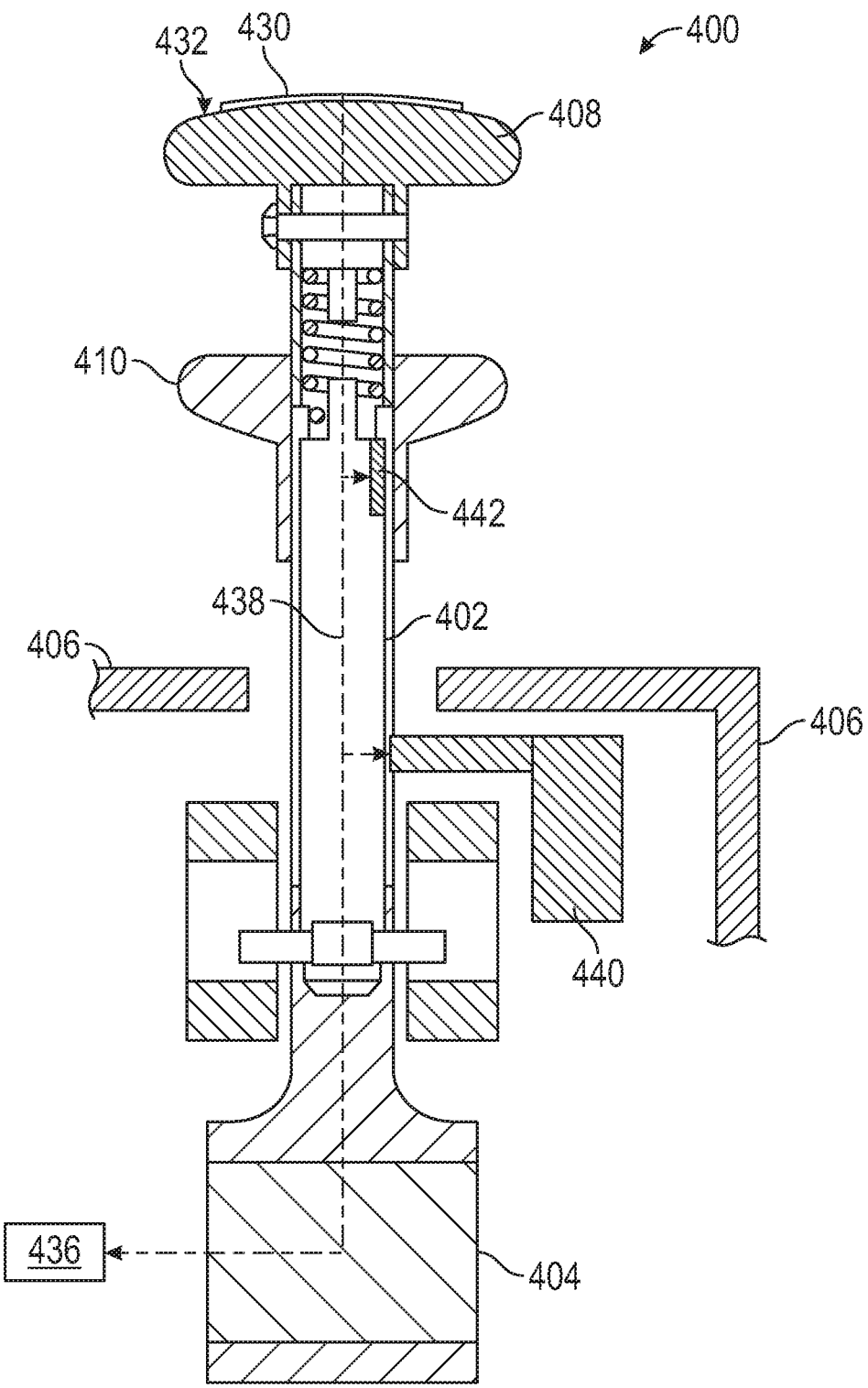
FIG. 4 is a schematic cross-sectional illustration of a selector lever in accordance with an embodiment of the present disclosure.

Turning now to FIG. 4, a schematic illustration of an internal structure of a selector lever 400 in accordance with an embodiment of the present disclosure is shown. The selector lever 400 includes a shaft 402 that is pivotable about a pivot 404, with the pivot 404 contained within a housing 406. A handle 408 is located on an end of the shaft 402 with a collar 410 movable along the shaft 402.

Further, as shown, a touch sensor 430 is located on a top 432 of the handle 408 and is arranged to detect the presence of a user's hand on the handle 408. The touch sensor 430 is electrically connected to a controller 436 through a connection line 438. The connection line 438 arranged within the shaft 402 is positioned and installed such that the connection line 438 does not interfere with operation of the selector lever 400.

The controller 436 can be located within the housing 406 or may be located external or remote from the housing 406. The controller 436 includes one or more electronic or electrical components to enable operation in accordance with embodiments of the present disclosure. For example, the controller 436 includes various electronics and components to enable capture of data or signals, processing thereof, storage of such data, and/or of applications or programs, or other electrical components as will be appreciated by those of skill in the art. In accordance with some embodiments, the controller 436 includes one or more processors and memory. The processor(s) are configured to control methods for operating the selector lever 400 or aspects/parts thereof (e.g., the collar 410 and/or the shaft 402). The control methods may be stored in memory in non-transitory computer media, e.g., in the form of computer instructions, programs, applications, coding, etc. Embodiments disclosed herein may be implemented on any type of computer regardless of the platform being used. For example, an aircraft control system may be employed. The aircraft control system may include a processor, associated memory, a storage device, and numerous other elements and functionalities typical of computers as known in the art. The aircraft control system may also include input means, such as a key inputs, buttons, switches, keyboard and a mouse, etc., and output means, such as a monitor, display, etc., and/or other input/output means as will be appreciated by those of skill in the art.

In some embodiments, the controller 436 may be operably connected to one or more locking mechanisms of the selector lever 400. For example, as shown, a shaft locking mechanism 440 may be positioned within the housing 406 and configured to mechanically, electrically, or electromechanically lock the position or prevent movement of the shaft 402. In combination, or alternatively, a collar locking mechanism 442 may be positioned within the shaft 402 and arranged to lock or otherwise prevent movement or actuation of the collar 410 along the shaft 402. In some embodiments, the locking mechanisms 440, 442 may be electromechanical, wherein a locking pin (or other structure) is actuated into and out of engagement with the shaft 402 or the collar 410 to prevent or allow movement thereof. In some embodiments, the locking mechanisms 440, 442 may be electromagnetic, wherein an electromagnetic configuration is used to secure the shaft 402 and/or the collar 410 in a fixed position and to release such component when a user's hand is detected on the handle 408 at the touch sensor 430. Those of skill in the art will appreciate that other types of locking mechanisms may be employed without departing from the scope of the present disclosure.

Figure 5:
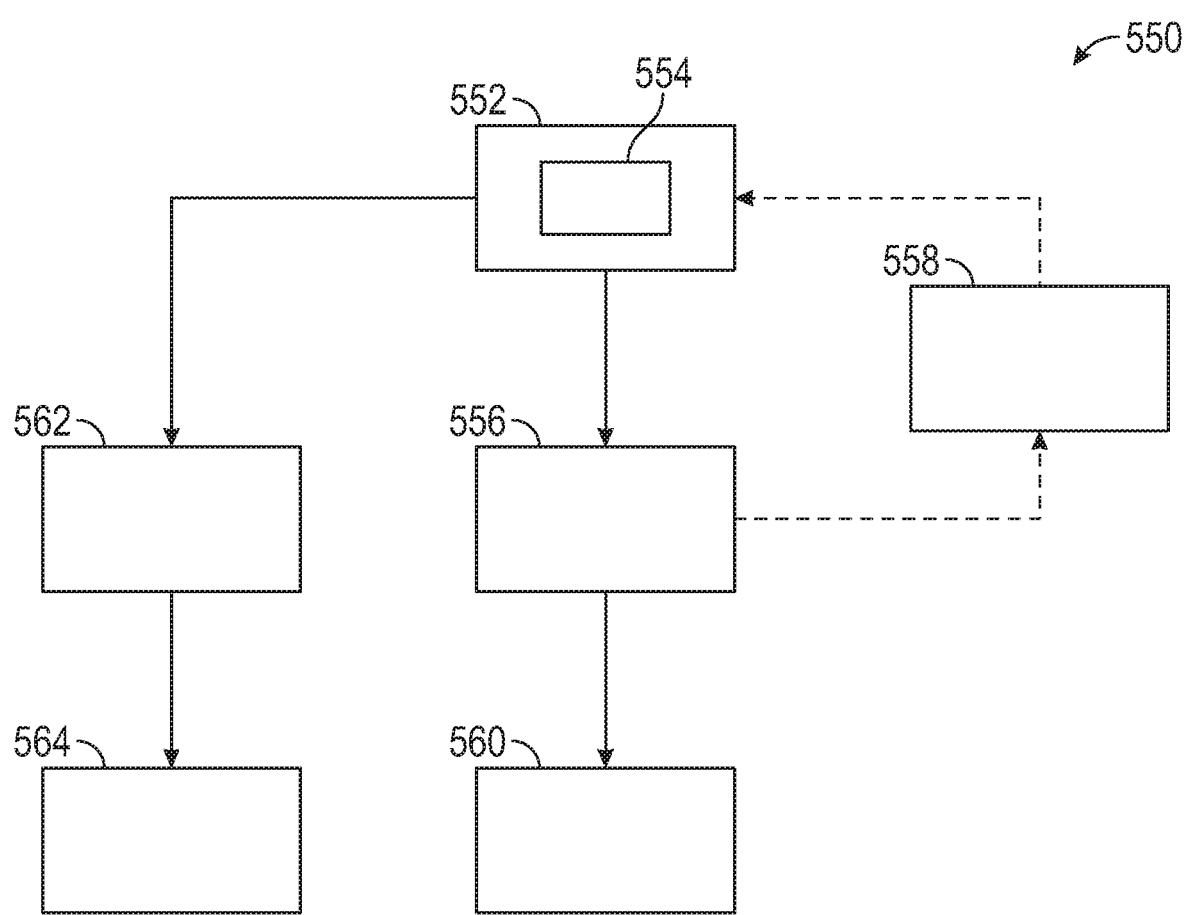
FIG. 5 is a schematic block diagram of a control process in accordance with an embodiment of the present disclosure.

Turning now to FIG. 5, a schematic signal diagram 550 for operation of a selector lever in accordance with an embodiment of the present disclosure is shown. As shown, a selector lever 552 is configured having a touch sensor 554 thereon. The touch sensor 554 is arranged to generate an electrical signal when a user places a hand on the touch sensor 554, e.g., on a handle of the selector lever 552.

When a hand is detected at the touch sensor 554, a signal may be sent to an electronic controller 556 of the selector lever 552 (e.g., similar to that shown and described above). The electronic controller 556 is configured to make a lock/unlock decision at block 558. If a decision to unlock is made, the selector lever 552 may be operated by the user. However, if a decision to remain locked is made, the selector lever 552 remains secured in the current position. The decision at block 558 may be based on a time duration of contact between a user and the touch sensor 554. Thus, inadvertent and temporary or transient contact with the touch sensor 554 may not be sufficient to enable movement of the selector lever 552. For example, a predetermined touch may be required to be detected at the touch sensor 554. The predetermined touch, in some non-limiting embodiments, may be a specific time duration that is preset to indicate a user intends to operate the selector lever 552. In other embodiments, an applied pressure threshold may be required to thus indicate an intended touch or use by a user. In such embodiments, the capacitive touch sensor can include pressure sensing elements.

In some embodiments, the electronic controller 556 may communicate with both primary and secondary control surfaces. For example, in some embodiments, the electronic controller 556 can be in communication with one or more secondary surfaces 560. In this non-limiting example, the secondary surfaces 560 may be slat and flap surfaces, with the primary surfaces being ailerons, elevator, and rudder. In such embodiment, movement of the secondary surfaces 560 is controlled by the electronic controller 556. The electronic controller 556 commands surface actuation based on a valid position of the selector lever 552. The decision block 558 decides whether a motion of the selector lever 552 is valid and the electronic controller 556 actuates the secondary surface(s) 560 accordingly. The flight computer 562 and electronic controller 556 receive the input at the touch sensor 554 and provide an action to the notification system 564 and secondary surfaces 560, respectively. In some embodiments, a robust system may include communication between the flight computer 562 and electronic controller 556.

In some embodiments, in combination with the decision at block 558, the system can include various notifications based on the detection of a hand on the touch sensor. For example, a signal generated by the touch sensor 554 may be transmitted to a flight computer 562. The flight computer 562 may be the primary computer of an aircraft that is used by pilots to control and operate the aircraft. The flight computer 562 may include, control, or be in communication with a notification system 564. The notification system 564 can include auditory and/or display systems for outputting a notification to a user within a cockpit. For example, when a touch is detected at the touch sensor 554, a signal may be sent to the flight computer 562. The flight computer 562 may then cause the generation of a notification at or from the notification system 564. Notifications can include, but are not limited to, visual displays and/or auditory announcements. The notifications can be used to indicate a position of the selector lever 552 (e.g., detent position) and/or control surface position. Accordingly, when a user places their hand on the selector lever 552, information can be provided to the user regarding the selector lever and/or control surfaces of the aircraft.

Figure 6:
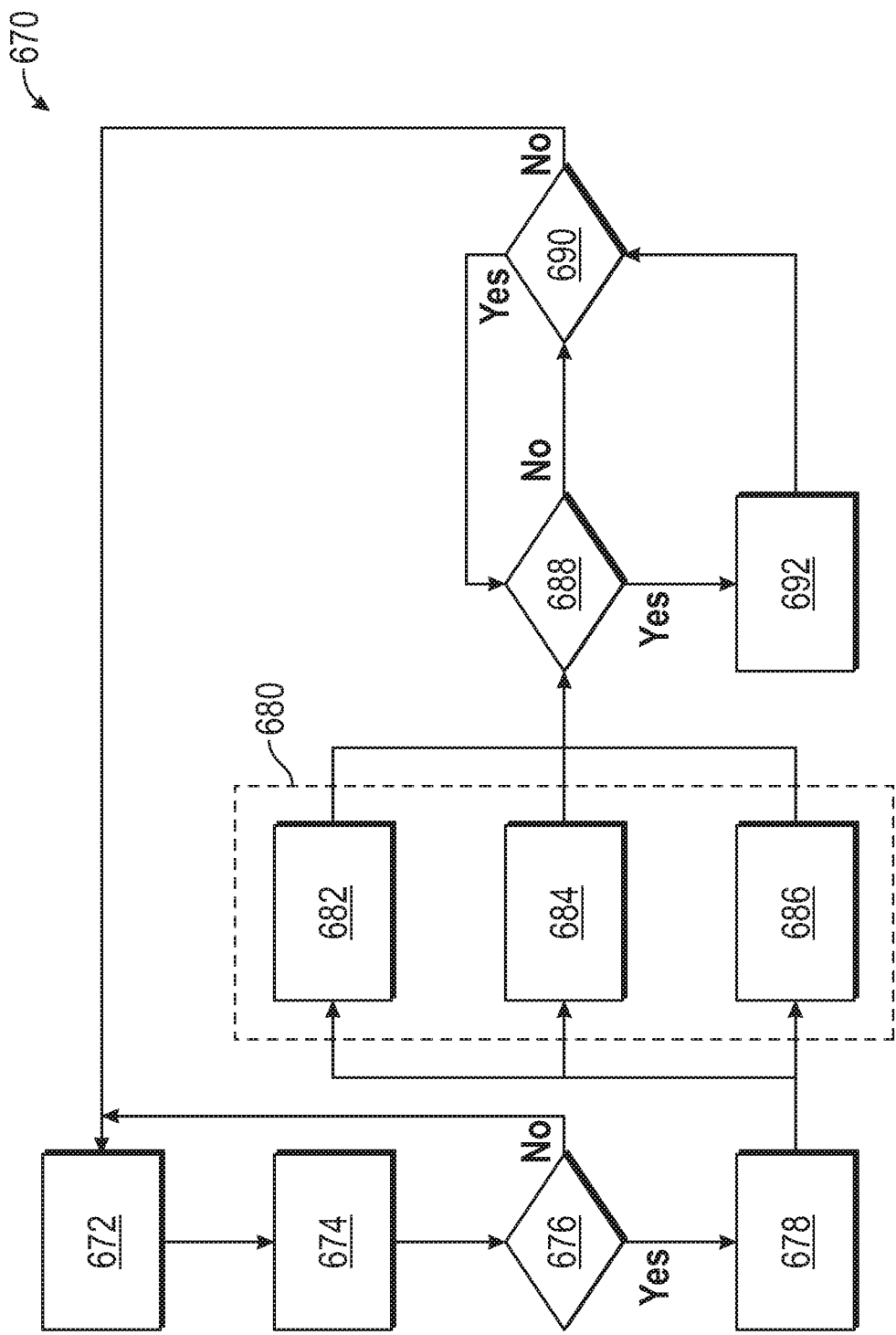
FIG. 6 is a schematic block diagram of a control process in accordance with an embodiment of the present disclosure.

Turning now to FIG. 6, a logic diagram or flow process 670 for operation of a selector lever in accordance with an embodiment of the present disclosure is shown. The logic described with respect to FIG. 6 may be performed using a controller of a selector lever, as described above. The selector lever includes a touch sensor on a handle thereof.

At block 672, a default state of the selector lever is maintained. For example, in a true-false logic, the state may be set to "false" such that no touch is detected, and the selector lever is locked by one or more locking mechanisms, as described above.

At block 674, a touch is detected at the touch sensor of the selector lever. The touch may be intentional or unintentional.

At block 676, a determination regarding an intention is made. This determination may be time based, such that when the initial touch at block 674 is detected, a clock is started, and if a predetermined threshold is measured, a determination is made that a user intends to operate the selector lever. The time period may be in the order of milliseconds, but sufficient in duration to eliminate accidental contact. In some embodiments, the determination may be made based on contact between multiple touch sensors, such as on the top and side of the handle (e.g., on surfaces 332, 334 shown in FIG. 3). In some embodiments, the determination may be made based on an applied pressure detected at the sensor, and/or a combination of time and pressure.

If it is determined that no intention for operation is made, the flow process will return to block 672, otherwise, the flow process will continue to block 678.

At block 678, the state of the system is set to active (e.g., "true"). When switched to active, the flow process continues to block 680 which, as shown, includes various possible functional configurations.

For example, at block 682, the system may generate a notification regarding the position of the selector lever and/or the position of a control surface of the aircraft. The notification may be displayed on a screen or other display of the aircraft and/or may be an auditory announcement regarding the position of the selector lever and/or control surface of the aircraft.

At block 684, in combination or alternatively to block 682, the system may unlock an electromechanical and/or electromagnetic lock that secures the selector lever when in the default (e.g., "false") state. When unlocked, a user can operate the selector lever to change a position thereof, and thus change a position or orientation of one or more associated control surfaces of the aircraft.

At block 686, in combination or alternatively to block 682, 684, the system may perform a software unlock feature. In such embodiments, in a software lock state, even if the selector lever is physically moved, no change in the position/state/orientation of associated aircraft control surfaces may occur. The software lock can provide a redundancy to prevent unintended operation and changes in the position of aircraft control surfaces.

After the one or more functional operations of block 680 are performed, the process flows to block 688 wherein whether there has been a change in position of the selector lever is detected. If, at block 688, no change in the position of the selector lever is detected, the flow process continues to block 690. At block 690, the system continues to monitor a signal from the touch sensor on the handle. If it is determined that the user removes their hand from the handle, the flow process 670 will return to block 672, otherwise, the flow process will return to block 688. The process of flow from block 688 to block 690 to block 672 may occur when a user merely desires to be provided the notification information provided from block 682 or similar process/action.

However, at block 688, if it is determined that the selector lever is moved, the flow process continues to block 692 where a notification (similar to block 682) is generated to indicate a newly entered position of the selector lever and/or aircraft control surfaces. If the user continues to hold the handle of the selector lever, a loop of blocks 688, 690, 692 may be performed until it is determined that the user's hand has been removed from the handle of the selector lever, and thus return to block 672.

Advantageously, embodiments provided herein are directed to selector levers of aircraft having a touch sensor configured to enable safe operation of the selector lever and prevent unintended operation thereof. Various types of safety features are enabled herein, including, but not limited to, touch-activated unlocking (mechanical or software) of a selector lever and/or aircraft control surface and announcements and/or displays of position information related to the selector lever and/or the aircraft control surfaces.

The use of the terms "a", "an", "the", and similar references in the context of description (especially in the context of the following claims) are to be construed to cover both the singular and the plural, unless otherwise indicated herein or specifically contradicted by context. The modifier "about" used in connection with a quantity is inclusive of the stated value and has the meaning dictated by the context (e.g., it includes the degree of error associated with measurement of the particular quantity). All ranges disclosed herein are inclusive of the endpoints, and the endpoints are independently combinable with each other.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

Accordingly, the present disclosure is not to be seen as limited by the foregoing description, but is only limited by the scope of the appended claims.

What is claimed is:

1. A selector lever system of an aircraft, the selector lever system comprising:
   a selector lever configured to control operation of one or more aircraft control surfaces, the selector lever having a handle configured to enable manual operation of the selector lever;
   a touch sensor arranged on the handle, wherein the touch sensor is configured to detect the presence of a hand of a user placed on the touch sensor, and the touch sensor is configured to generate a signal indicating the presence of a hand of a user on the handle; and
   a controller arranged in communication with the touch sensor, the controller configured to at least one of generate a notification associated with the selector lever when the signal is received from the touch sensor and unlock the selector lever from a locked state when the signal is received from the touch sensor.

2. The selector lever system according to claim 1, wherein the touch sensor is located on at least one of a top surface and a side surface of the handle.

3. The selector lever system according to claim 1, wherein the notification is at least one of an auditory announcement and a visual display indicating a position of at least one of the selector lever and the one or more aircraft control surfaces.

4. The selector lever system according to claim 1, wherein the controller is part of a flight computer of the aircraft.

5. The selector lever system according to claim 1, wherein the touch sensor is one of a capacitive touch-sensor, an inductive touch-sensor, and a pressure touch-sensor.

6. The selector lever system according to claim 1, wherein the selector lever comprises a housing and a shaft, wherein the handle is disposed on an end of the shaft.

7. The selector lever system according to claim 1, further comprising a software locking mechanism configured to prevent movement of the one or more control surfaces in response to movement of the selector lever until a predetermined touch is detected at the touch sensor.

8. The selector lever system according to claim 7, wherein the predetermined touch is at least one of a contact of a predetermined duration and a predetermined pressure.

9. The selector lever system according to claim 1, further comprising a locking mechanism configured to lock the selector lever in a locked state until a predetermined touch is detected at the touch sensor.

10. The selector lever system according to claim 9, wherein the locking mechanism is at least one of electro-mechanical and electromagnetic.

11. The selector lever system according to claim 9, wherein the locking mechanism is arranged to engage with at least one of a collar and a shaft of the selector lever.

12. The selector lever system according to claim 9, wherein the predetermined touch is at least one of a contact of a predetermined duration and a predetermined pressure.

13. A method of controlling a selector lever of an aircraft, the method comprising:
    detecting a predetermined contact with a touch sensor on a handle of the selector lever, the selector lever configured to control operation of one or more aircraft control surfaces, wherein the touch sensor is configured to detect the presence of a hand of a user placed on the touch sensor, and the touch sensor is configured to generate a signal indicating the presence of a hand of a user on the handle; and
    at least one of generating a notification associated with the selector lever in response to the detected predetermined contact and unlocking the selector lever from a locked state in response to the detected predetermined contact.

14. The method of claim 13, wherein the notification is at least one of an auditory announcement and a visual display indicating a position of at least one of the selector lever and the one or more aircraft control surfaces.

15. The method according to claim 13, wherein the detection is performed by a controller operably connected to the touch sensor.

16. The method according to claim 13, wherein the touch sensor is one of a capacitive touch-sensor, an inductive touch-sensor, and a pressure touch-sensor.

17. The method according to claim 13, wherein a shaft of the selector lever is moveable along a detent system, and wherein the notification comprises an indication of a detent position of the shaft.

18. The method according to claim 13, further comprising a software locking mechanism configured to prevent movement of the one or more control surfaces in response to movement of the selector lever until the predetermined contact is detected at the touch sensor.

19. The method according to claim 13, wherein the selector lever comprises a locking mechanism configured to lock the selector lever in a locked state until the predetermined contact is detected at the touch sensor.

20. The method according to claim 19, wherein the locking mechanism is arranged to engage with at least one of a collar and a shaft of the selector lever.

\* \* \* \* \*